(12) United States Patent
Fliess

(10) Patent No.: US 12,422,292 B2
(45) Date of Patent: Sep. 23, 2025

(54) METERING SYSTEM

(71) Applicant: VERMES MICRODISPENSING GMBH, Holzkirchen (DE)

(72) Inventor: Mario Fliess, Munich (DE)

(73) Assignee: VERMES MICRODISPENSING GMBH, Holzkirchen (DE)

( * ) Notice: Subject to any disclaimer, the term of this patent is extended or adjusted under 35 U.S.C. 154(b) by 14 days.

(21) Appl. No.: 18/262,542

(22) PCT Filed: Jan. 26, 2022

(86) PCT No.: PCT/EP2022/051765
§ 371 (c)(1),
(2) Date: Jul. 21, 2023

(87) PCT Pub. No.: WO2022/167289
PCT Pub. Date: Aug. 11, 2022

(65) Prior Publication Data
US 2024/0295424 A1    Sep. 5, 2024

(30) Foreign Application Priority Data
Feb. 4, 2021    (DE) .................... 10 2021 102 657.1

(51) Int. Cl.
*G01F 11/02*    (2006.01)
*G01F 11/38*    (2006.01)

(52) U.S. Cl.
CPC ............ *G01F 11/023* (2013.01); *G01F 11/38* (2013.01)

(58) Field of Classification Search
CPC ........ G01F 11/023; G01F 11/38; G01F 11/36; G01F 11/021; B05C 5/0225
See application file for complete search history.

(56) References Cited

U.S. PATENT DOCUMENTS 9,789,512 B2 * 10/2017 Ikushima ............ B05C 11/1034
11,958,072 B2 * 4/2024 Ikushima .............. G02F 1/1333
(Continued)

FOREIGN PATENT DOCUMENTS

CN    105499072 B    6/2018
CN    207667940 U    7/2018
(Continued)

OTHER PUBLICATIONS

International Search Report issued in PCT/EP2022/051765; mailed Apr. 25, 2022.

*Primary Examiner* — Donnell A Long
(74) *Attorney, Agent, or Firm* — Studebaker Brackett PLLC

(57) ABSTRACT

The invention relates to a metering system (1) for metering a metered medium comprising a frame housing unit (2) and a lever mounting unit (3) which his supported on the frame housing unit (2) comprising a lever mount (4). The invention further comprises a, preferably asymmetrical lever (30) which is supported rotatably by means of the lever mount (4) about a tilt axis (R) comprising a two-sided lever arm (31) extending substantially in a longitudinal direction (30L) of the lever (30), wherein one lever arm side (35), preferably the longer lever arm side (35), has a first actuator engagement point (36) close to the tilt axis and is in contact remotely from the tilt axis at an end portion (33) with an ejection element (13), preferably a ram (13), and wherein the other lever arm side (32), preferably the shorter lever arm side (32), has a second actuator engagement point (37) close to the tilt axis. The invention further comprises two actuators (50a, 50b), which, during operation, exert a tilting moment in opposite directions on the lever (30) at the first and second actuator engagement point (36, 37), wherein the actuators (50a, 50b) are placed obliquely to one another. Together, the lever mounting unit (3), the lever (30), and the two actuators (Continued)

Figure 1:
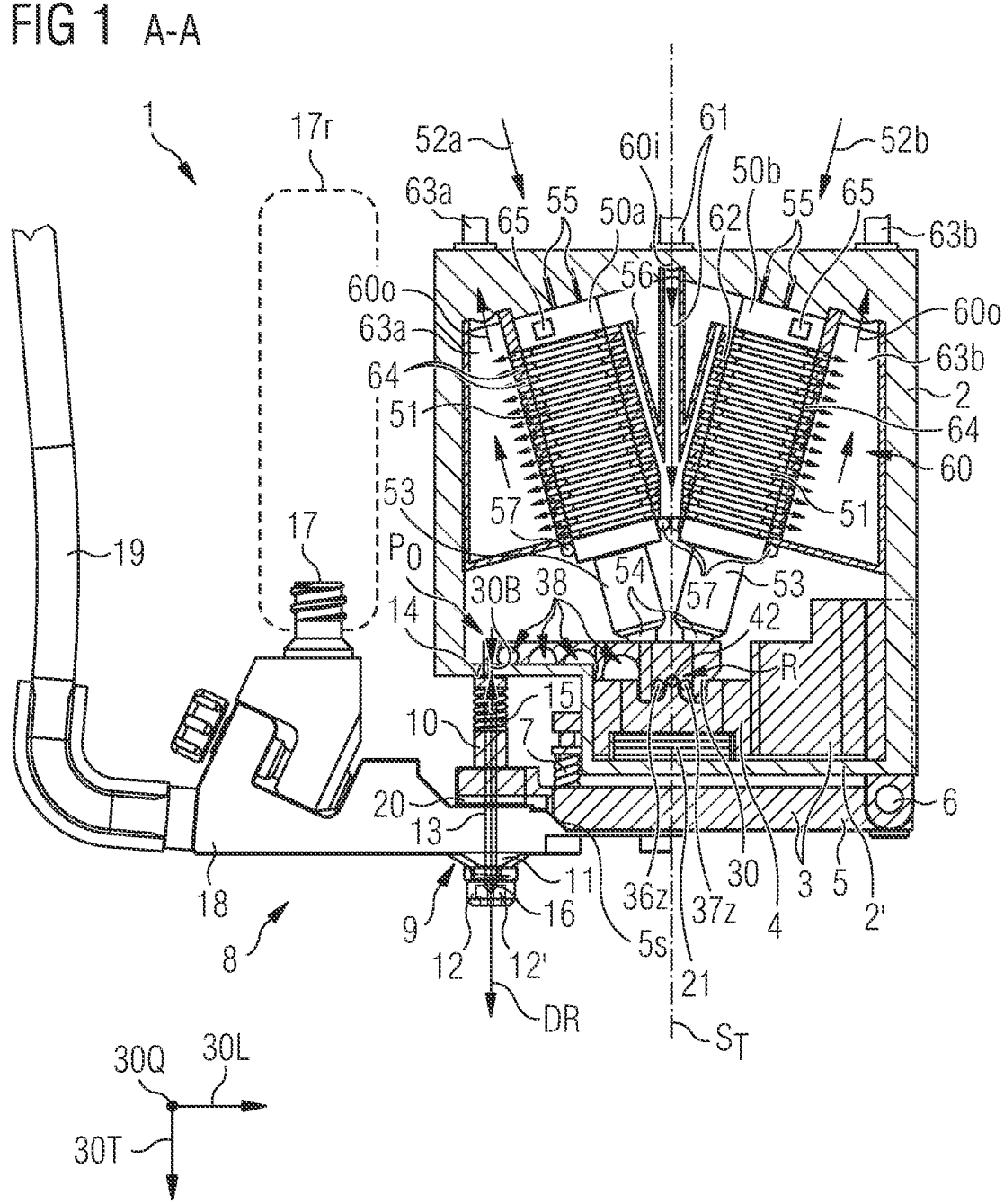

(50*a*, 50*b*) thereby form a movement mechanism (4, 30, 50*a*, 50*b*), which is braced on the frame housing unit (2) by means of at least one spring element (21), preferably a disc spring set (21), wherein the spring element (21) is preferably arranged so that it braces the lever mounting unit (3) against the frame housing unit (2) via the lever (30) as well as via the two actuators (50*a*, 50*b*).

24 Claims, 3 Drawing Sheets

(56) References Cited

U.S. PATENT DOCUMENTS

| | | | |
|---|---|---|---|
| 2015/0300748 | A1 | 10/2015 | Hong et al. |
| 2015/0302292 | A1 | 10/2015 | Hong et al. |
| 2019/0022692 | A1* | 1/2019 | Ikushima ................ F04B 9/00 |
| 2020/0179974 | A1 | 6/2020 | Ikushima |
| 2021/0018353 | A1 | 1/2021 | Fliess |

FOREIGN PATENT DOCUMENTS

| | | |
|---|---|---|
| CN | 110947579 A | 4/2020 |
| DE | 102017122034 A1 | 3/2019 |
| EP | 3636354 A1 | 4/2020 |
| JP | 2016-051399 A | 4/2016 |
| JP | 2016-510374 A | 4/2016 |
| KR | 10-1301107 B1 | 8/2013 |
| KR | 10-2019-0118093 A | 10/2019 |

* cited by examiner

FIG 1 A-A

FIG 2
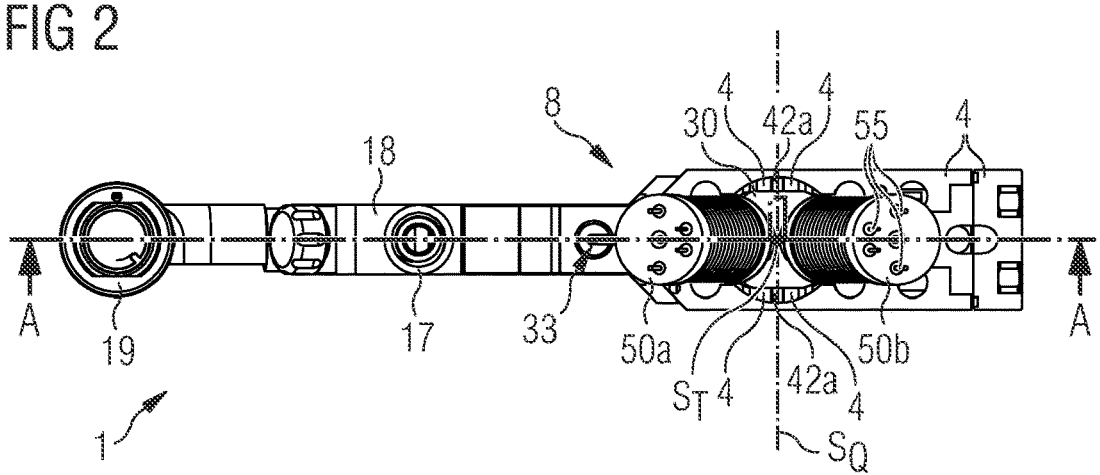
FIG 3
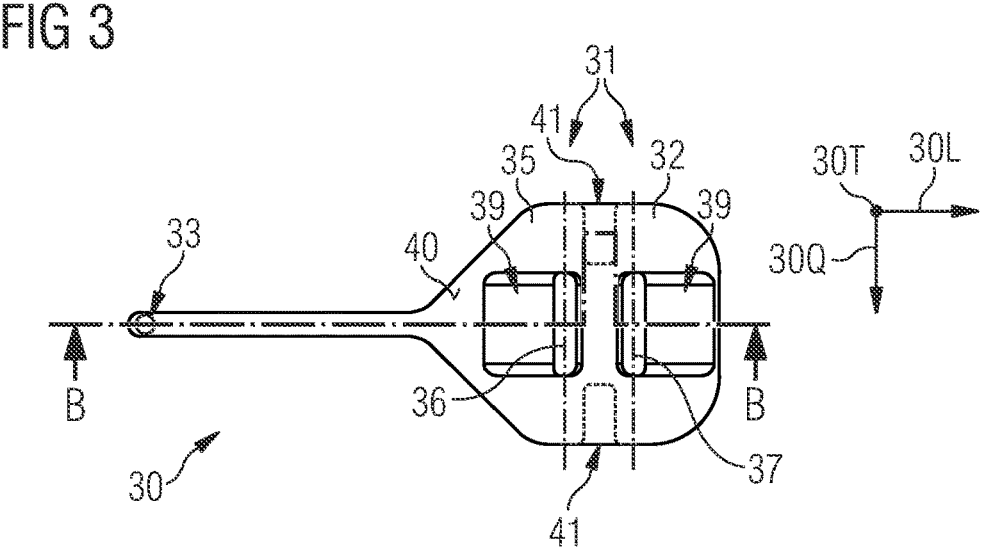
FIG 4 B-B
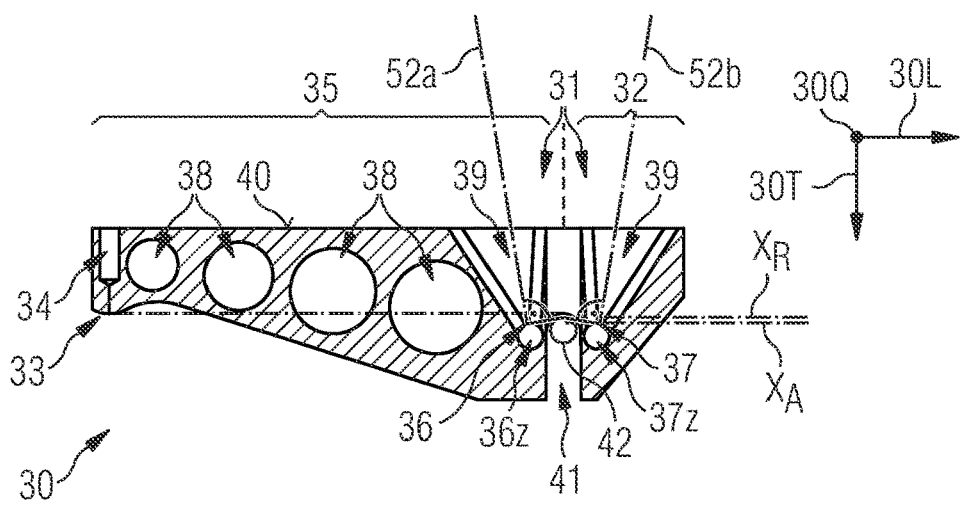

METERING SYSTEM

The invention relates to a metering system for metering a metered medium, comprising a frame housing unit, a lever mounting unit which his supported on the frame housing unit comprising a lever mount, a lever which is supported rotatably by means of the lever mount about a tilt axis comprising a two-sided lever arm extending substantially in a longitudinal direction, wherein one lever arm side has a first actuator engagement point close to the tilt axis and is in contact remotely from the tilt axis at an end portion with an ejection element, and wherein the other lever arm side has a second actuator engagement point close to the tilt axis. The metering system further comprises two actuators, which, during operation, exert a tilting moment in opposite directions on the lever at the first and second actuator engagement point.

Metering systems of the above-mentioned type are usually used to systematically meter a medium, which is to be metered, typically a liquid to viscous metered substance. In the context of the so-called "micro-metering technology", it is thereby often necessary that very small quantities of the metered medium or metered substance, respectively, are applied to a target surface with pinpoint accuracy, namely without contact, i.e. without a direct contact between the metering system and a target surface. Such a contactless process is often also referred to as "jet process". The metering of adhesive dots, soldering pastes, etc. when fitting printed circuit boards or other electronic elements or the application of converter materials for LEDs is a typical example for this.

It is an important requirement thereby to convey the metered media to the target surface highly accurately, that is, at the correct point in time, at the correct location, and in an accurately metered quantity. This can take place, for example, by means of a dropwise delivery of the metered medium via a nozzle of the metering system. An ejection of individual drops in a type of "ink jet process", as it is used in similar form, for example also in ink jet printers, is a preferred process thereby. The size of the drops or the quantity of the medium per drop, respectively, can be predetermined thereby as accurately as possible by means of the setup and the control as well as by means of the effect of the nozzle attained thereby.

To deliver the medium from the metering system, a movable ejection element (generally a ram) can be arranged in the nozzle of the metering system. The ram can be pushed or moved, respectively, with relatively high speed in the direction of a nozzle opening, thus in a forward metering direction, in the interior of the nozzle, whereby a drop of the medium is ejected, and can be withdrawn again subsequently.

The ram can usually also be brought into a closed position, in that it tightly connects to a sealing seat of the nozzle opening in the nozzle and remains there temporarily. In the case of more viscous metered media, it can also be sufficient that the ram simply remains in the withdrawal position, i.e. at a distance from the sealing seat, without a drop of the medium escaping from the nozzle opening.

The present invention can be used in the case of all above-mentioned alternatives, independently of the concrete ejection principle, i.e. in the case of a jet process, an open ink jet process, or also with a classical closing element.

Because of the desire to continuously achieve a higher machine productivity or operating speed, respectively, there is now a further requirement to apply the metered media ever more quickly, thus, for example, the drops with a high ejection frequency, thus in rapid chronological sequence, to the target surface.

This leads to vibrations, which can propagate from the dynamically excited components in the metering system to the entire metering system. Due to the fact that the metering system is a vibratory system, the excitations in the structure of this system are optionally intensified. In particular a natural frequency of the system can be excited thereby. If natural frequency and excitation frequency match, resonant vibrations are created, which cause unwanted relative movements, which can negatively influence the metering behavior, in particular the metering accuracy and metering quality.

Metering systems known from practice can drive such desired ejection frequencies only theoretically. Tests have shown that the currently known metering systems can no longer operate in a stable and smooth manner with the desired ejection frequencies in the context of the required quality criteria. The metering quality as well as the metering accuracy decrease in such a way that it is thus not possible to achieve a satisfactory metering result with the provided metering frequencies.

To address this problem, preload springs, thus springs for directly preloading the actuators, are often used in practice. In the case of high dynamic stress, the components, in particular the actuators and frame component parts heat up unevenly as well as to varying extents.

This results in a deviating position of the closing element to the nozzle and thus in a deviation of the metering result. In the case of high excitation frequencies, natural resonances of the dynamically vibrating preload springs can additionally result, which then likewise negatively influence the metering process. Interference and/or resonance effects, which negatively influence the metering result in the short run and which lead to increased friction or increased wear of the respective components, respectively, in the long run, can thus result in the desired frequency ranges.

It is thus an object of the present invention to improve known metering systems, in particular to specify a particularly quick metering system, by means of which a higher metering frequency is achieved with a high metering accuracy and metering quality of metered media on a workpiece.

This object is solved by means of a metering system according to patent claim 1.

As mentioned above, the metering system according to the invention for metering a metered medium on a workpiece or substrate, respectively, comprises a frame housing unit. A frame housing unit means a housing of the metering system, which encloses in a "frame-like manner", thus a housing, which surrounds a majority of the components of the metering system, such as, e.g., a movement mechanism of the metering system, which will be described later, overleaf. For functional reasons, the frame housing unit is embodied in a relatively massive and inert manner because it acts as stable counter bearing or as inert frame of the metering system, respectively, in order to be able to resiliently support in particular the dynamic components of the metering system, such as the just-mentioned movement mechanism, relative thereto, as will be described further below.

The frame housing unit is designed in such a way, i.e. is correspondingly inert or massive, respectively, that it hardly to not at all responds in response to the high vibration or movement frequencies, respectively, of the movement mechanism, thus behaves statically relative to the dynamic movement mechanism. In that it thus calms the entire metering system, it ensures a consistently good metering behavior.

It can thereby preferably form a first main mass of the metering system with low natural frequency, which is as insensitive as possible, i.e. which is not stimulated to vibrate if possible, for a frequency range of the lighter individual components of the movement mechanism of the metering system, which move dynamically, at high frequency, so that an interference-related development of resonant vibrations or reverberation, respectively, of the entire metering system in the metering operation is thus virtually ruled out based on the different vibration frequencies.

As already likewise mentioned above, the metering system according to the invention further comprises a lever mounting unit, which is supported on the frame housing unit comprising at least one lever mount for a lever of the metering system. The lever mounting unit is advantageously separated from the frame housing unit in so far as it is structurally protected against a tilting or rotating, respectively, but can be shifted along an axis in a depth direction or metering direction, respectively, relative to the frame. This shifting is prevented by means of the piezoelectric actuators, which are spring-braced between the frame housing unit and the lever mounting unit via the lever mounting unit. It is attained thereby that a thermally identical change of the two piezoelectric actuators and/or a thermal change of the frame housing unit lead to a relevant change of the distance between nozzle and ejection element, as will be described later.

The lever mounting unit is thereby preferably arranged partially inside, partially outside the frame housing unit, thus supported on the frame housing unit.

The lever mount of the lever mounting unit is a first rotary mounting part of a rotary mount, which is a part of the movement mechanism. The rotary mount or tilt mount, respectively, is formed from lever mount and lever, and indirectly transfers the force, which is alternately generated for the metering operation of two actuators, to the ejection element, which is to be driven. The ejection element, which can preferably also be a ram in the case of the present construction of the invention, then conveys a metered medium at least in portions out of the nozzle according to one of the above-described metering methods or metering types, respectively.

According to the literal meaning, the lever mount thereby serves the purpose of bearing the lever, which is supported rotatably or tiltably, respectively, about a tilt axis of the tilt mount, so that the lever can be moved relative to the tilt axis in a provided metering direction of the metering system from an initial rest position, namely a horizontal central position or can be tilted at least about a certain angle defining the stroke length, respectively. The tilt axis or also axis of rotation, on which the lever is tiltably supported, therefore likewise runs horizontally, but perpendicular to the lever or to a longitudinal direction of the lever, respectively.

Relative direction indications, such as "top", "bottom", "on the top side", "on the bottom side", "laterally", "left", "right", "longitudinally", etc. refer arbitrarily here to the illustration in the figures, which will be described further below, even though the metering system is used or utilized, respectively, mainly in the orientation illustrated in FIG. 1 during operation. This means that a metering onto a workpiece during the jet process mostly takes place so that the metered drops essentially hit the workpiece a bit in free fall or flight, respectively, with the force of gravity, thus a metering takes place in the metering direction or in a downward depth direction, respectively.

In the broadest sense, the lever simply refers to a mechanical force transducer, which consists of a rigid body, which is supported rotatably as usual about a center of rotation, namely the tilt axis. The lever of the metering system according to the invention thereby comprises a two-sided or two-armed lever arm, respectively, extending substantially in a longitudinal direction. "Substantially in a longitudinal direction" means that the lever extends through the metering system at least in a main direction of extension, namely a longitudinally running deflection direction between ejection element and actuators. However, the lever is generally a three-dimensional component, which also extends at least proportionately in the two other orthogonal spatial directions. For example, it can extend in a transverse direction (parallel to the tilt axis) between two side surfaces or in a depth direction (perpendicular to the tilt axis and to the longitudinal axis), in the direction of the lever mount at least to the extent that it measures at least a fraction of its main direction of extension in the longitudinal direction in these directions.

As generally usual, the term "lever arm" here also refers to the part (or the length, respectively), of a lever, which reaches from a tilt axis or an axis of rotation of the lever, respectively, to an engagement point, at which the force acts or engages with the lever, respectively. A two-sided or two-armed lever arm, respectively, therefore has two such parts or lever arms, respectively, each comprising an engagement point, on which a force in each case engages with the lever. The lever arms can hereinafter also be referred to as lever arm sides of the lever arm of the lever. The respective distances of the engagement points from the common axis of rotation are also referred to as lever arm lengths. In principle, the larger the distance of an engagement point from the tilt axis, thus the larger the lever arm length, the smaller the force can be, in order to compensate for a correspondingly larger force with correspondingly shorter lever arm length.

In the case of the metering system according to the invention, one of the lever arm sides of the two-sided lever arm further has a first actuator engagement point close to the tilt axis, thus a first point, with which the force engages. Remotely from the tilt axis on an end portion, the respective lever arm side is in contact with a nozzle of the metering system by means of the ejection element, which has already been mentioned above. As intended, the movement of the lever in the metering direction of the metering system transfers, in turn, to the ejection element. The terms "close to the tilt axis" and "remotely from the tilt axis" are to thereby be related relative to one another. An arrangement close to the tilt axis thus only means that the respective component is arranged closer to the tilt axis than a component arranged remotely from the tilt axis.

Close to the tilt axis, the other lever arm side likewise has a second actuator engagement point—thus a second point, with which the force engages alternately to the first point, as will be described below. The respective lever arm side can be formed symmetrically to the other lever arm side, e.g. simply go nowhere remotely from the tilt axis on the lever arm side comprising the second actuator engagement point (spaced apart from the ejection element). Preferred designs or further developments, respectively, of the lever will be described later.

The metering system according to the invention furthermore comprises two actuators, which, during operation, exert a tilting moment in opposite directions on the lever at the first and second actuator engagement point.

In the context of the invention, a tilting moment is to simply be understood as a torque, which ensures that the lever tilts about a certain angle and the ejection element, which is in contact, is therefore moved as provided for metering purposes. The term of the tilting moment used here, however, does not refer to a classical tilting moment, in the case of which a body, to which it is applied, tilts or tips over, respectively, starting at this certain tilting moment. On the contrary, the tilting refers literally to the tilting of the lever about a certain angle to the horizontal or to a central position, respectively, in which the lever is located at least initially prior to start-up or at a point in time, at which the actuators are currently deenergized, respectively.

The above actuator engagement points in each case refer to at least individual points or actuator points of contact, respectively, in terms of contact or engagement points of the actuators on the lever, respectively, at which the actuators engages with the lever or are in contact with the lever, respectively. Actuator engagement points, however, can also consist of a plurality of points, a line, or a surface. For example, the actuator engagement points can be formed as two longitudinal engagement lines or actuator contact points, respectively, which run transverse to the lever as well as perpendicular to the directions of action of the actuators. This lends itself in order to limit the rotational movement or tilting movement of the lever, respectively, relative to the lever mount only to the provided tilting movement about the tilt axis in order to move the ejection element in a desired metering direction. Virtually no further rotational components can thus be created, which could cause, for example, additional friction or wear, respectively, in the system. Preferred designs of the actuators will likewise also be described later.

According to the invention, the actuators of the above-mentioned metering system are placed obliquely to one another. "Placed obliquely to one another" means that on the front side the actuators run towards one another obliquely in a common plane or are directed obliquely at a common point, respectively, on the other side or behind the tilt axis, respectively. In a further exemplary embodiment, which will be described below, they are directed, for example, at a point below the horizontal plane of the tilt axis of the tilt bearing of lever mount and lever.

In any case, however, "placed obliquely to one another" means in particular that the actuators or the directions of action thereof, respectively, are placed or aligned, respectively, at an angle of less than 180°, but greater than 0° to one another. The invention thus turns away from the fact that the actuators are aligned exactly opposite to one another or parallel or anti-parallel to one another, respectively, as will be described in more detail below.

Together, the lever mounting unit (comprising the lever mount), the lever, and the two actuators furthermore form a movement mechanism, which movement mechanism is braced, according to the invention, on the frame housing unit by means of at least one spring element.

The movement mechanism is thereby designed so that it can set the ejection element of the metering system as desired in particular at high frequency into a longitudinal ejection and withdrawal movement in and opposite to the metering direction, i.e. to the bottom or top in the case of a usual arrangement. For this purpose, the ejection element can be structurally connected or coupled, respectively, to the movement mechanism at an actuating point, e.g. the ram on a ram head, or can be preloaded against it by means of a spring, such as, e.g., a torsion spring, thus, for example, only be in pressure contact. In any event, the coupling takes place in such a way that the tilting moment generated by the actuators—typically a simple linear deflection or linear movement, respectively—is transferred in turn or alternately, respectively, from the lever (as ejection or withdrawal movement) via a contact surface of the lever to the ejection element, preferably a ram head of the ram, in order to deliver the metered medium from the nozzle.

The spring element can be, for example, at least one pressure spring. It can be preloaded with approximately 3-4 kN, i.e. resiliently brace the movement mechanism against the frame housing unit. The two actuators can thereby each be preloaded or biased, respectively, for example, with 1.5 to 2 kN, preferably 1.8 kN. Preferred designs of the spring element will be described later.

By means of the construction according to the invention of the subject matter of the invention, it is achieved that a higher ejection frequency of the metering system can be driven with consistently good metering accuracy and metering quality. In addition, a dynamically stressed return spring can additionally be forgone in each case at the two actuators by means of the construction according to the invention, because said return springs do not operate in a stable manner at all frequencies because they can lead to wobble movements or unwanted vibrations of the system, respectively, in particular in the case of quick or high-frequency metering, respectively, as it is in fact desired in the case of the invention.

With the preloading of the movement mechanism, which is resilient as a whole, against the frame housing unit, it is achieved that dynamic vibrations remain in the dynamic system, wherein the preloading, which is resilient as a whole, is not a component of the dynamic system. Possible individual thermal effects caused by different local heating of the individual metering system components (piezo actuators, frame housing unit, lever, etc.) additionally do not have an individual effect on the distance between ejection element and nozzle—as was previously the case in the prior art—but are compensated for the most part. The metering accuracy and metering quality of the entire metering system can thus no longer be significantly influenced at least by effects of this type.

The construction according to the invention of the subject matter of the invention, in particular the oblique placement of the actuators in a common plane, additionally provides for a tighter or closer position, respectively, of the engagement points of the actuators on both sides around the center of rotation of the lever, which lever, in turn, induces the ejection element via its lever arm for metering purposes. In that the lever can thus be designed to be smaller and lighter and therefore has a lower moment of inertia, higher accelerations and thus a quicker metering can be performed by means of the metering system according to the invention.

As further advantage, in particular the size of the drops or the quantity of the medium per drop, respectively, can also be reduced even further. Larger surfaces can thus furthermore be wetted with a metered medium in the same time interval. The construction according to the invention is particularly suitable in particular for a contactless metering of small quantities of a metered medium or metered substance, respectively—thus in a micro-dosed manner, with pinpoint accuracy and without contact, i.e. without a direct contact between the metering system and a target surface—onto a target surface, namely during the jet process or a metering by means of jet process, respectively.

Further, particularly advantageous designs and further developments of the invention follow from the dependent claims as well as from the following description, whereby individual features of different exemplary embodiments or alternatives, respectively, can also be combined into new exemplary embodiments or alternatives, respectively.

There are different options to increase the ejection frequency of the metering system. For example, the movement mechanism, in particular the lever, can be optimized or designed in an improved manner, respectively.

The two actuators, which are placed obliquely to one another, can generally engage on both longitudinal sides of the lever, for example with an end portion of a lever arm of the lever. For this purpose, an actuator engagement point could in each case be formed on two opposite longitudinal sides of the lever.

The two actuators can preferably be located on a common longitudinal side of the lever, so that they can engage with the lever substantially from a common direction. The first actuator engagement point and the second actuator engagement point can therefore be formed and arranged on the same longitudinal side.

In the case of a normal arrangement of the metering system (with the metering opening directed downwards), said longitudinal side—for example in the case of the exemplary embodiment, which will be described later in detail—is a longitudinally running top side of the lever. They thus exert a tilting moment in opposite directions on the lever only on a longitudinal side of the lever or alternately, respectively, thus only stress the lever on one side. On the opposite (generally lower) longitudinal side of the lever, sufficient space is thus moreover available for the lever mount, which ensures a particularly space-saving compact setup of the metering system as a whole. The arrangement of the actuators on a longitudinal side of the lever additionally makes it possible that the lever mount and the lever can be braced simultaneously against the actuators by means of the spring element, which has already been mentioned above, so that the movement mechanism is thus preloaded as "dynamic" unit against the frame housing unit as "static" unit so as calm vibrations.

There are preferred options for the position of the actuators to the lever. For example, one actuator could thus engage perpendicularly with the lever, wherein the other actuator abuts obliquely against the lever, so that the two actuators are placed obliquely to one another in any event.

However, the actuators can preferably in each case be arranged at the same angle to a common angle bisector or axis of symmetry, respectively (of an imaginary "V" from the actuators), wherein the angle bisector or axis of symmetry, respectively, is perpendicular to the top side of the lever. Viewed from a longitudinal side, the actuators can thus be arranged in a V-shaped manner such that they can be brought into alignment by means of an imaginary mirroring on the axis of symmetry or angle bisector, respectively. Viewed spatially, the actuators can be arranged in V-shaped manner such that they can be brought into alignment by means of an imaginary mirroring on a symmetry plane from said axis of symmetry as well as an axis of symmetry running perpendicular thereto horizontally through the actuators, as will be described later on the basis of an exemplary embodiment.

The actuators can particularly preferably be arranged so as to be placed obliquely to one another such that the longitudinal direction of the lever or lever longitudinal axis, respectively, is located in a virtual plane spanned by the direction of action or longitudinal axis of the actuators, respectively, or the tilt axis of the lever is perpendicular to this virtual plane, respectively. For practical purposes, the metering system can thus be designed in an extremely flat manner in spite of the actuators, which are placed obliquely to one another (in a transverse direction perpendicular to the longitudinal direction of the lever), namely in a similarly flat manner as in the case of the constructions, in which—as was customary—only one actuator or two parallel actuators are installed.

The actuators can thereby generally be arranged in the angular range between two extremal positions—namely a parallel position running next to one another on the one hand and an opposite frontal position, i.e. when the actuators run towards the lever and towards one another in a line or in common alignment, respectively, from different sides—(exclusive of said extremal positions) obliquely to one another on a longitudinal side of the lever axially symmetrically to the common angle bisector.

According to a preferred exemplary embodiment of the invention, the actuators, more precisely the longitudinal axes or directions of actions thereof, respectively, can be placed or arranged, respectively, in a V-shaped manner maximally or at most, respectively, at a 150° to one another. More preferably, they can be aligned to one another maximally at a 120° angle and even more preferably maximally at a 90° angle. Particularly preferably, they can be placed obliquely to one another maximally at a 60° angle, and most preferably maximally at a 30° angle.

Angles smaller than 20°, in particular smaller than 10°, can then only still be achieved by means of a correspondingly smaller cross section of the actuators or by means of a corresponding extension and thinning of the transducers of the actuators. At an angle of 20°, "correspondingly smaller" would mean for example that half the cross section of each actuator may be less than 10° in each case. The mentioned extension, in contrast, would inevitably lead to a significant enlargement of the housing or of the metering system, respectively, which, in turn, makes the construction larger and more susceptible with regard to bending strength.

Provided that the mentioned disadvantages do not have any relevance, it could nonetheless also be desired that the actuators are preferably placed obliquely to one another maximally at an angle of 20° and particular preferably maximally at an angle of 10°.

As is well known, the following applies thereby: The steeper the actuators are placed relative to one another, i.e. thus the smaller the common angle between them, the more force is transferred to the lever because they quasi abut "more perpendicularly" against the lever or the portion of the transverse forces decreases, respectively. A steeper arrangement, however, simultaneously also ensures that the actuators have to be arranged so as to be moved apart or spaced apart further from one another at the tip, respectively, because they stand in their own way or block one another, respectively, due to their dimensions, in particular due to their transverse extension or their diameter perpendicularly to their longitudinal axis, respectively. The actuator engagement points therefore move away further and further from one another or from the tilt axis located therebetween, respectively, in the case of increasingly steeper position, until, in the case of a parallel position, they are spaced apart from one another at least in the distance of their diameter, based on their central longitudinal axes, as this is the case in an disadvantageous manner in the prior art. The force arm of an actuator in the case of a parallel arrangement of two actuators thereby corresponds to half the diameter of an actuator.

Due to the fact that in the case of piezoelectrical actuators, the attainable mechanical energy is a function of the actuator volume, i.e. cross section or diameter, respectively, as well as length of the actuator, thinner actuators have less force than thicker actuators of the same length. In addition, the thinner the actuators are designed, the more unstable they become and the more unpredictable their behavior (see, with regard to this, "buckling bar problem" or also "bending strength"). For said reasons, it is thus also not helpful to use thinner, correspondingly longer actuators, in order to reduce the force arm, in order to increase the lever deflection, in turn.

This is so because the further away or spaced apart from the tilt axis, respectively, the actuators engage with the lever, the less stroke or lever deflection, respectively, can be translated or transferred to the lever, respectively, by means of their length-related fixed stroke length of the respective actuator. This is so because the stroke length of an actuator—in the case of a design with stacked piezo elements, thus of a "piezo stack actuator"—is a function of its specific length (and thus limited in the case of a given length). Due to an optimal selection of the position, thus of the actuator engagement point, with which the respective actuator engages with the lever, the possible lever deflection can thus be increased in an advantageous manner by means of the lever in spite of the limited stroke length of the actuator itself, in order to thus achieve a larger stroke movement than the actual stroke length of the actuator. It thereby applies that the closer the engagement with the tilt axis, the larger the lever deflection, but the more force is required as well due to the shorter force arm.

The actuators can be arranged closer to the tilt axis by means of an oblique positioning, compared to a parallel arrangement of two actuators—with the same embodiment of the actuators—so that a larger lever deflection can thus be achieved.

The actuators of the metering system can be realized in different ways, wherein piezo actuators are preferably used, in particular in the case of applications requiring an extremely fine metering resolution. Compared to other types of actuators, e.g., hydraulically, pneumatically and/or electromagnetically operated actuators, piezo actuators, which are also referred to as a piezoelectrically operated actuators, have the advantage of the highly precise and in particular quick controllability. Piezo actuators are advantageously characterized by extremely short reaction or response times, respectively, which usually lie significantly below the corresponding values of other actuator principles. A further advantage is that compared to other types of actuators, piezo actuators require comparatively little installation space within a metering system. Piezo actuators thus offer an efficient solution for the operation of metering systems, in particular in the case of extremely fine metering requirements.

In the case of piezoelectrical stack actuators, it is generally a fact that they can only generate a rather small stroke, but relatively high forces. For example, a piezo stack with a length of 36 mm can achieve a stroke length of 50 µm. It is therefore generally necessary to translate the small stroke so that it becomes significantly larger, whereby the force obviously decreases accordingly.

Alternatively, the actuators can also be magneto-resistive actuators. They use the principle that the dipoles of a ferromagnetic material align identically, i.e. in a common orientation, when applying an external magnetic field. By rotating the dipoles to the original position, the length of the material changes approximately in the range of several µm/m to mm/m as a function of the respective material.

The metering system can thus preferably be formed so that the actuators engage as closely as possible with the tilt axis in order to effect the largest possible lever deflection. Due to the fact that the force of the actuators consequently decreases and the force arm only enters by the power of one in the case of the driving moment—thus leading to a disadvantage here with dynamic applications, e.g. when the metering system is displaced dynamically relative to the workpiece in a metering plant for metering purposes—it is advantageous to design the measurements of the lever or general lever dimensions, respectively, to be as small as possible in order to obtain a quicker metering system. This is so because due to the conservation of angular momentum, a lever with a smaller mass moment of inertia can be "rotated" or moved back and forth, respectively, about the axis of rotation or tilt axis, respectively, faster than a lever with a larger mass moment of inertia.

Due to the fact that the mass moment of inertia by the power of two is a function of the distance of the respective mass point (of the lever) to the center of rotation or to the tilt axis, respectively, it increases disproportionately with the length of the lever (and thus the distances of the mass points from the center of rotation).

With a given translation ratio (force to force am), the mass moment of inertia of the lever can also be smaller in that, according to the invention, the actuators are arranged obliquely to one another because the distance of the force arms to the center of rotation or the length of the force arms, respectively, becomes smaller in this way, which, in turn, provides for the formation of a smaller lever. A smaller lever, thus a smaller mass moment of inertia, thus ultimately leads to a higher resonance frequency of the metering system with actuators placed obliquely to one another than in the case of a system with parallel actuators of the same design.

For a quicker movement of the lever, it is thus advantageous to center more mass closer to the tilt axis.

The lever can thus preferably have an inhomogeneous mass distribution. Inhomogeneous means that the mass of the lever is not distributed symmetrically or evenly, respectively, over its length in the longitudinal direction, but that the lever is constructed asymmetrically at least based on its mass.

A mass of the lever can particularly preferably also be distributed relative to the tilt axis along the lever in such a way that the lever as a whole, based on the tilt axis, has the smallest possible (mass) moment of inertia. During the construction, it is thus preferably also ensured that as much mass as possible is located close to the center of rotation and as little mass as possible remotely from the center of rotation, thus in the elongate arm towards the ejection element.

The weight of the lever, however, can thereby preferably be reduced or distributed to the center of rotation, respectively, only just so much that it still has a sufficiently high stability, which allows for a particularly quick vibrating of the lever, for example. In top view, i.e. viewed from the top, the lever can be formed, for example, substantially with a "spoon-shaped" outline, whereby a predominant part of the mass close to the center of rotation is then positioned in an "oval" or "round" part, respectively, around the center of rotation.

The lever can preferably have a plurality of recesses, particularly preferably through bores running transversely or in the transverse direction of the lever, respectively, in order to reduce weight.

The actuator engagement points with the lever for the actuators can preferably not be located or be arranged, respectively, in a horizontal plane of the tilt axis. This means that they are thus not located in the same plane as the tilt axis, in which the tilt axis is in fact located.

Especially in a dynamic case (e.g. when the metering system in a metering plant is displaced relative to the workpiece dynamically for metering purposes), when the lever is tilted by several degrees about the tilt axis due to the tilting moments of the actuators, it is achieved in an advantageous manner by means of the outside-of-a-plane arrangement of the actuator engagement points on the lever that the actuators only perform transverse or shear movements, respectively, which are as small as possible, perpendicular to the direction of action of the actuator, when the tilting moment (in the form of a longitudinal deflection) is applied to the lever.

This is so because in the case of larger transverse movements, thus directional components transversely to the direction of action or transverse components, respectively, a significantly arched pendulum movement of the actuators along a turning circle or circle about the tilt axis, respectively, through the two actuator engagement points of the actuators on the lever results in response to an actually straight deflection in the direction of action. The pendulum movement becomes straighter by means of a reduction of the transverse components. It is avoided thereby, if possible, that, in response to their longitudinal deflection in the direction of action, the actuators, which do in fact have a very high mass, swing perpendicular thereto during their longitudinal deflection in the direction of action and thus cause unwanted vibration effects and/or a higher wear of the components.

The actuator engagement points can generally be formed above the tilt axis of the lever, for example directly on the surface of the top side of the lever, so that the actuators engage with the lever there.

To be able to arrange the actuator engagement points even closer to the tilt axis when the actuators have an arrangement placed obliquely to one another, the lever can preferably be formed and arranged in such a way that the two actuator engagement points are positioned or sunk, respectively, in the lever further away from a top side or longitudinal side of the lever, respectively, facing the actuators, than the tilt axis, on which tilt axis the lever is supported on the lever mount in a rotatably or tiltably supported manner, respectively, as mentioned. "Further away from a top side or longitudinal side of the lever, respectively, facing the actuators" means that in the case of an arrangement of the lever as intended on the lever mount, the actuator engagement points are located further away from the piezo elements of the actuators or deeper in the lever, respectively, than the tilt axis. The actuators are thus arranged in such a way that they in each case initially run past the tilt axis with its front or its tip, respectively, thus pass or run through the horizontal plane of the tilt axis, respectively, and engage with the lever only then at the actuator engagement points formed in a recessed manner below the actual tilt axis or are in contact with the lever only there, respectively.

The respective actuator engagement points of the two actuators can thus in each case be arranged in the same way or in an identically offset manner, respectively, parallel to the common tilt axis. In the case of an alternative preferred exemplary embodiment, the actuators can in each case also act on an actuator engagement point of the lever, which is offset in the transverse direction or parallel to the longitudinal direction, respectively.

The actuators, which are arranged on or which abut against the lever in a V-shaped manner, respectively, can preferably be aligned or engaged with the actuator engagement points, respectively, in such a way that a longitudinal axis of the actuators is substantially perpendicular to a respective connecting line between the respective actuator engagement point and the common tilt axis, in each case in a horizontal central position of the lever.

In other words, the actuators thus engage with the actuator engagement points offset by the connecting line, at a right angle to the tilt axis. The central position of the lever thereby corresponds to a position or setting, respectively, of the lever, in which the lever is horizontal and both actuators are currently unpowered or deenergized, respectively.

The actuators can thus engage with the actuator engagement points of the lever in a V-shaped manner, in each case in a direction of action running past the tilt axis, in which they are thus arranged or placed obliquely, respectively, in such a way that the direction of action thereof is tangential to the circle around the central tilt axis of the lever through the two actuator engagements points of the actuators on the lever (or perpendicular to the connecting line from the respective actuator engagement point to the tilt axis, respectively, in particular to the surface of the cylinder pins forming the tilt axis, as will be described later in an exemplary embodiment), in order to thus keep transverse movements or a transverse portion of the pendulum movements, respectively, of the actuators along the circle or an arc length of the circle, respectively—along which the actuator engagement points are moved or displaced, respectively—as small as possible, when the actuators move back and forth, that is the piezo elements expand or contract, respectively.

It should be noted at this point that, viewed microscopically, the central axes of the cylinder pins do not exactly represent the tilt axis, but the connection of the jacket surfaces of the cylinder pins (which sit firmly in the lever mount on the underside) in each case with the slightly larger cylindrically recessed jacket surfaces of the lever, which are pushed tangentially against one another, so that the jacket surfaces of the lever perform a minimal rolling movement on the jacket surfaces of the cylinder pins when tilting. An exact tilt axis is thus not present in this sense, but a more complex movement. The central axes of the cylinder pins, however, can be roughly equated approximately with the tilt axis here at least in the case of a macroscopic view.

In other words, the actuators can thus preferably be arranged tangentially on a circle about the tilt axis on the actuator engagement points in such a way that they substantially perform a straight movement during operation for metering a metered medium in response to an ejection and withdrawal movement. "Substantially" means thereby that the actuators perform a straight movement without noteworthy transverse movement on the circle in terms of a pendulum movement during an ejection and withdrawal movement. Said tangential arrangement means that the longitudinal axes or directions of action of the actuators, respectively, abut tangentially against the actuator engagement points on the circle around the tilt axis, as has already been described above.

There are preferred options for the further design of the metering system.

The lever mounting unit can preferably be of multi-part construction.

In addition to the already-described lever mount, it can particularly preferably comprise a fluidic positioning for a fluidic unit of the metering system. This fluidic unit of the metering system can likewise be coupled to the lever mounting unit.

The lever mount can thereby particularly preferably be connected in a rotatable, articulated, or tiltable manner, respectively, to the fluidic positioning via a rotary joint located outside of the frame housing unit.

Alternatively or additionally, the lever mount and the fluidic positioning can be supported in a mechanically adjustable manner against one another, thus in terms of in a rotatable or tiltable, respectively, or shiftable manner, for example by means of an adjusting element at an angle relative to the rotary joint.

The lever mounting unit can preferably comprise a ring construction, which encloses a portion of the frame housing unit in a ring-like manner by leaving at least one gap. As usual, a "gap" is understood here as a narrow, elongate opening forming an intermediate space. "Ring construction" or "ring-like", respectively, means a construction of two components, which are formed or set up, respectively, i.e. structurally designed, in the manner of a ring. The ring construction thus identifies a ring-shaped structure or a ring-shaped arrangement, respectively, in the case of which the two components can be combined in a circular manner to form a closed ring. The portion of the frame housing unit can be, for example, a housing bottom of the frame housing unit.

The lever mounting unit can particularly preferably be supported on the frame housing unit in a displaceable manner by means of the spring element, which is preferably arranged in a gap between the lever mounting unit and the portion of the frame housing unit.

Alternatively or additionally, the ring construction can comprise a rotary joint. When the metering system is set up as described above, the rotary joint can be the above rotary joint.

The lever mount of the lever mounting unit can thereby be coupled in a mechanically adjustable manner against itself to the fluidic positioning via the lever and the ram for adjusting the ram-nozzle distance on a side of the fluidic positioning remotely from the rotary joint by means of an adjusting element, in particular an adjusting screw—by leaving at least one gap to the frame housing unit so as to enclose the spring element in the ring construction of the lever mounting unit in a ring-like manner. The adjusting screw can, for example, also be a finely threaded screw, by means of which a position of the ram in the nozzle, i.e. the ram-nozzle distance, can be fine-tuned or adjusted even more exactly, respectively.

The "side remotely from the rotary joint" means a portion along the fluidic positioning (from the rotary joint to the ram) here, which is located on a ram-side half on the other side of the center of the fluidic positioning, thus as close as possible to the ram.

Regardless of the above-mentioned advantages relating to piezo actuators, piezo actuators represent components, in which large power losses are converted, which can cause a strong heating of the piezoelectric material, wherein the piezoelectric material itself has thermal limitations due to its specific Curie temperature and the respective contacts of the electrodes have thermal limits as well.

To be able to additionally counteract a heat-up of the movement mechanism, in particular of the piezo actuators, both piezo actuators can be designed so that compressed ambient air or compressed air, respectively, flows around them all because compressed air is already available in most of the metering system plants.

Provided that not enough heat can be dissipated from the piezo actuators by means of this compressed air or pressurized air, respectively, for example due to a higher ambient temperature in the area of application of the metering system, in order to permanently keep the piezo actuators as well as other temperature-sensitive regions of the metering system below a temperature, which is critical for the precise operation of the metering system, a cooling device, through which gas, preferably air, or liquid flows, can preferably in each case surround the actuators.

The cooling device can thereby preferably have a feed channel between the actuators comprising a number of inlets into the actuators and two eccentric discharge channels comprising a number of outlets into the discharge channels. The cooling device can thereby be formed as a largely closed circuit, i.e., a cool cooling flow is introduced into the metering system, which absorbs heat while reducing the temperature of the movement mechanism and which is subsequently discharged from the metering system again.

A back pressure in the cooling device can be reduced by means of this embodiment of the cooling device of a feed channel with two discharge channels. The feed channel can run, for example, centrally, substantially parallel to the actuators. However, it can preferably be integrated into the frame housing unit surrounding the actuators. The two discharge channels can be formed and arranged on the outer sides of the actuators facing away from one another, in each case opposite the feed channel, so that the cooling flow can in each case be guided continuously past the actuators during operation very easily in order to absorb heat.

The lever and the lever mount of the movement mechanism can thereby not be flown against separately, for example, but can only also be flown around by the exhaust heat of the piezo actuators.

According to an advantageous design of the invention, the actuators can in each case additionally be formed in an encapsulated manner. For example, the actuators can be movably enclosed with sufficient play in a substantially cylindrical encapsulation.

A cooling flow flowing parallel along their longitudinal extension around the encapsulation can thus be applied to the actuators. The cooling medium of the cooling flow can be, for example, a gas, such as, e.g., air, nitrogen, etc., but also a liquid to viscous liquid, e.g. cooling liquid, provided that it has a sufficiently high flow speed to discharge the heat of the encapsulated actuators.

It is likewise conceivable that that gap or intermediate space, respectively, between the encapsulated actuators and the housing is preferably filled with a soft but heat-conducting mass, so that the exhaust heat of the actuators can be emitted directly to the frame housing unit and can be discharged there via the outer surface into to the environment or in increased form into the environment by means of a forced convection, for example by means of a ventilator.

Alternatively or additionally, the actuators can in each case comprise at least one temperature sensor in order to measure or monitor, respectively, the heating of the actuators and in order to optionally regulate the operating speed accordingly in order to lower the operational heating of the components. If an encapsulation is present, the temperature sensor can be arranged inside or outside the encapsulation. The position of the ram in the nozzle of the valve chamber or nozzle chamber, respectively, can be fine- tuned if necessary, preferably controlled automatically by means of the measured temperature data of the temperature sensor, so that the ram either exactly closes the nozzle of the valve (ram tip in the sealed position) or the nozzle is currently open (ram tip at a distance from the nozzle), even in response to a changing temperature, always in the central position of the lever—depending on which one of the above-mentioned methods is used.

The coupling between the movement mechanism and the ram can preferably be a lockable coupling. This means that the two components can preferably be connected in a positive-locking manner to one another for the operation, such as, e.g., screw-connected, clicked together, latched, particularly preferably in addition to a preload, which already contacts the component continuously.

With the components fixedly connected thereto, the frame housing unit can preferably form, as mentioned, a "first main mass" of the metering system. With the actuators, the lever, and the lever mounting unit, the movement mechanism can preferably combine a second, main mass fraction of the total mass of the metering system, i.e. form a "second main mass" of the metering system—optionally in combination with further components, such as, e.g., a fluidic unit.

To improve the general metering result or to calm the dynamic components of the metering system, respectively, a main mass of the metering system can be divided substantially evenly, i.e. substantially in equal parts, to the frame housing unit and the lever mounting unit. By means of an expedient distribution of the total mass of the metering system to the two "main masses" of approximately the same size, it can be ensured that the entire system, which is coupled in a vibratory manner, does not respond to the high-frequency vibrations of the movement mechanism in the first place.

In order to support the movement mechanism as a whole in a resilient manner against the frame housing unit, the spring element can preferably be a disc spring set. The disc spring set can thereby particularly preferably have a number of single spring plates and/or spring sets. Different single spring plates and/or spring sets can thereby also be realized so as to be combined to form a disc spring set. The movement mechanism can thus be preloaded by means of the disc spring set, in order to compensate for the thermal behavior, such as, e.g., temperature-related deformations etc. of the actuators.

Figure 5:
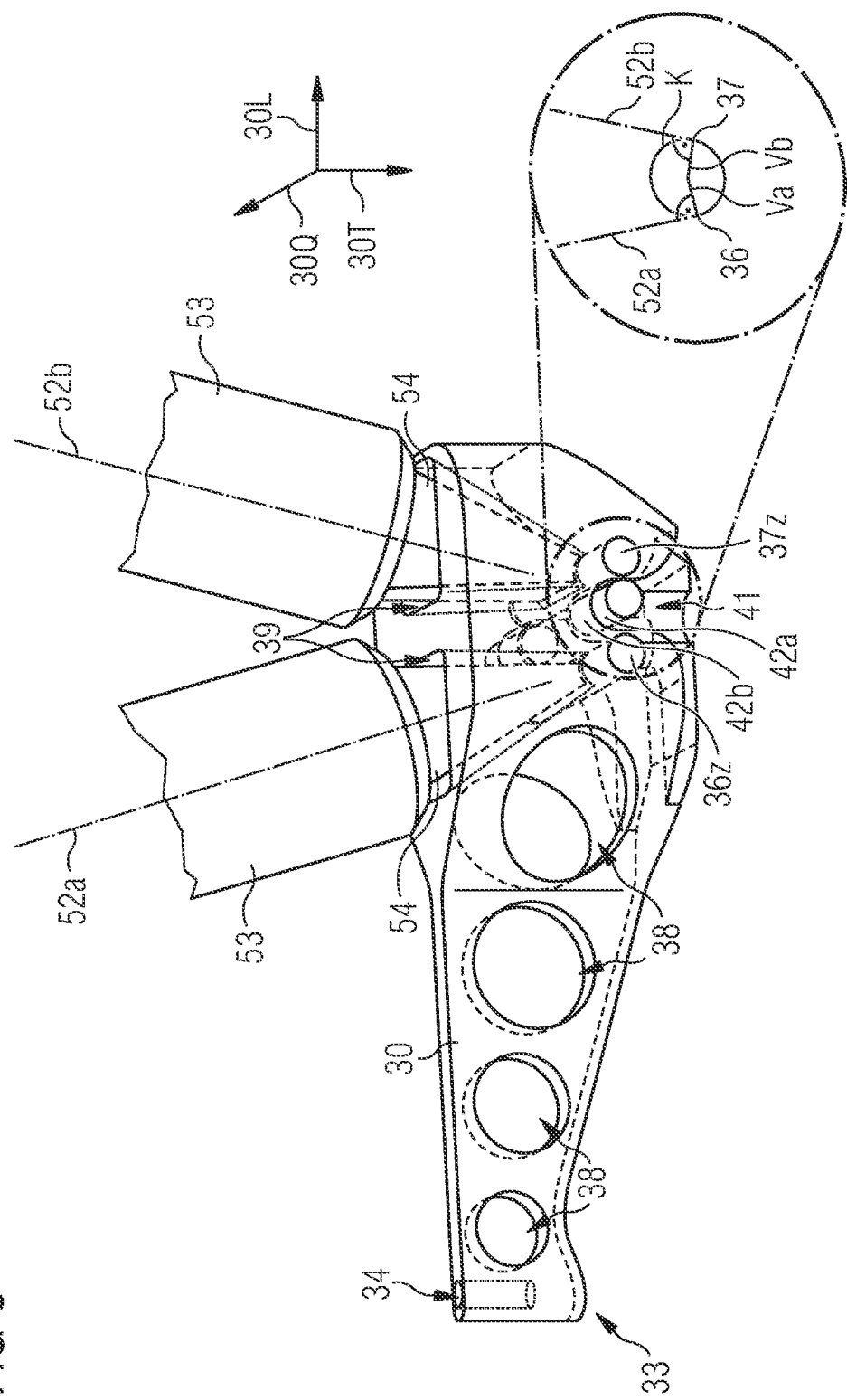

The invention will be described in more detail once again in the following with reference to the enclosed figures on the basis of exemplary embodiments. Identical components are thereby provided with identical reference numerals in the various figures. The figures are to generally be understood as not being to scale and only as schematic illustration, in which:

FIG. 1 shows a partial longitudinal section (along the section line A-A according to FIG. 2) of an exemplary embodiment of a metering system according to the invention, looking into the interior of a housing of the metering system, FIG. 2 shows a plan view onto the exemplary embodiment from FIG. 1, for the sake of a better overview and understanding without housing, FIG. 3 shows an enlarged, isolated plan view onto a lever of the exemplary embodiment from FIG. 1, FIG. 4 shows a longitudinal section along the section line B-B through the lever according to FIG. 3, FIG. 5 shows an enlarged, perspective, partially transparent partial view of two actuators abutting against the lever according to FIG. 1.

FIG. 1 shows a total view of a first exemplary embodiment of a metering system 1 according to the invention for metering a metered medium on a workpiece in a partial longitudinal section through the metering system 1 along a section line A-A, which runs at least mainly longitudinally in a longitudinal direction 30L (in FIG. 1: horizontally or left-right) through the metering system 1. This section line A-A is shown in FIG. 2 in a plan view or top view, respectively, onto the metering system 1. It runs centrally through the metering system 1, in particular through a lever 30 of the metering system 1, but jumps into an eccentric, parallel sectional plane in a region of the lever 30 between two so-called actuator engagement points 36, 37 of two actuators 50a, 50b at the lever 30 in a transverse direction 30Q of the lever 30 (which runs into the drawing plane in FIG. 1 and upwards in FIG. 2). At least one of the two decentralized cylinder pins 42, which form an axis of rotation R or tilt axis R, respectively, of the lever 30 (see FIG. 5) of the metering system 1 can thus be seen. The remaining direction of the metering system 1 running vertically in FIG. 1 is also embodied synonymously as depth direction 30T of the lever 30 in the following. In this direction, an axis or axis of symmetry $S_T$, respectively, shown in FIG. 1 also runs centrally between the two actuators 50a, 50b, which are placed obliquely to this axis $S_T$ or to one another, respectively, wherein the axis of symmetry $S_T$ thereby vertically inserts the mentioned tilt axis R. In FIG. 2, this axis of symmetry $S_T$ therefore runs into the drawing plane. A horizontal axis or axis of symmetry $S_Q$, respectively, runs perpendicular to said vertical axis of symmetry $S_T$ of the actuators 50a, 50b, here in FIG. 2 from the top to the bottom or vice versa, respectively. Together, the axes $S_T$ and $S_Q$ form a symmetry plane $S_Q$, $S_T$, relative to which the actuators 50a, 50b jointly form a symmetric "V". Apart from that, the section line A-A, which has already been mentioned above, runs through the metering system 1 perpendicularly through the symmetry plane $S_Q$, $S_T$.

In addition to a static frame housing unit 2, which encloses the metering system 1 largely all around, a dynamic movement mechanism 3, 4, 5, 30, 50a, 50b (namely a lever mounting unit 3 comprising a lever mount 4 and a fluidic positioning 5, the lever 30, which has already been mentioned above, and two actuators 50a, 50b), a spring element 21, formed here as disc spring set 21, which braces or preloads, respectively, the dynamic movement mechanism 3, 4, 5, 30, 50a, 50b against the static frame housing unit 2, as well as a fluidic unit 8, which can be coupled to the fluidic positioning 5 of the lever mounting unit 3 (description further below), which comprises, for example, a valve unit 9, which is in contact with the lever 30, comprising a nozzle 12 for metering the metered medium in a metering direction DR (here downwards), belong to the main components of the invention. For better differentiation or separation, respectively, the static frame housing unit 2 is shaded from top left to bottom right in FIG. 1, whereas the dynamic movement mechanism 3, 4, 5, 30, 50a, 50b, except for the two actuators 50a, 50b, is shaded from bottom left to top right.

The lever mount 4 is a part located within the frame housing unit 2 of the at least two-part lever mounting unit 3 of the metering system 1. The fluidic positioning 5 is a part of the lever mounting unit 3 located outside the frame housing unit 2. The two parts 4, 5 are connected rotatably to one another, for example, via a rotary joint 6 outside the frame housing unit 2. The substantially elongate fluidic positioning 5 thereby runs from the rotary joint 6 (in FIG. 1 on the right, below the frame housing unit 2), at a distance, parallel along the frame housing unit 2 or of a housing bottom 2' of the frame housing unit 2, which can preferably be releasably coupled (thus parallel along the lever mount 4 supported resiliently on the inner side of the frame housing unit 2), and can be pulled against the lever mount 4 by means of an adjusting element 7, here an adjusting screw 7, for adjusting the preload of an ejection element 13, here of a ram 13. Together, the two parts 4, 5 thus form a type of ring construction or ring, respectively, which ring engages around or surrounds, respectively, the above-mentioned housing bottom 2' of the frame housing unit 2 (as will be described later) and the spring element 21 in a ring-like manner.

The valve unit 9, which has already been mentioned above, is inserted between an end portion 33 of the lever 30 and the fluidic positioning 5. The valve unit 9, in turn, comprises a hollow-cylindrical valve body 10, in which the ram 13 is movably guided. A tappet spring 15 is thereby arranged between the valve body 10 and an end-side ram head 14 on the opposite end of a ram tip 16 of the ram 13, so that the ram 13 is resiliently supported. The distance between the nozzle 12 and the end portion 33 of the lever 30 can thus be changed by means of the adjusting screw 7, which provides for an exact adjustment of a ram end position based on a nozzle insert 12' and thus provides for a secure closing of the metering system 1. The adjusting screw 7 thereby has a finely threaded screw comprising a helical compression spring, in order to be able to perform a fine-tuning of the distance between the lever mount 4 and the fluidic positioning 5. An exact adjustment of the metering system 1 to the properties of the nozzle 12 and of the ram 13 can thus be ensured by means of the adjusting screw 7, so that possible manufacturing tolerances or also a wear can be compensated In the region of the valve unit 9, the fluidic positioning 5 additionally comprises a heating device, which is integrated into the fluidic positioning 5 and which is supplied and regulated by the electronics of the valve unit 9. The heating device itself, in turn, comprises a heating cartridge and a sensor, in order to heat or warm up, respectively, the metered medium for the metering, if necessary.

In addition to the described valve unit 9, the fluidic unit 8, which is releasably coupled to the fluidic positioning 5, comprises a metered media supply connection 17 for sufficiently as well as continuously supplying or feeding, respectively, a metered medium for the metering system 1 from a reservoir 17r, here, e.g., a metered substance cartridge 17r, into the valve chamber 11. A (non-illustrated) medium feed channel or media-carrying channel, respectively, runs between the metered media supply connection 17 and the valve chamber 11, located internally thereto.

As can be seen in FIG. 1, the fluidic unit 8 likewise includes a heating device, namely a heating unit 18 comprising a second heating zone along the media-conveying channel and a heating element 20 in the nozzle region or on the nozzle chamber 11 of the valve unit 9, respectively. For this purpose, the heating unit 18 is supplied via a connection 19 or a heating cable 19, respectively. However, in the case of a purely passive fluidic unit, which is thus not heated and regulated itself, a temperature control in the nozzle region is thus possible. In particular the media-conveying channel can additionally also be temperature-controlled with this, so that a preheating of the metered medium can be improved, which is advantageous in particular in the case of large volume flows.

The fluidic unit 8, which has already been mentioned above, is releasably attached close to the heating element 20 on an interface 5s of the fluidic positioning 5 remotely from the rotary joint, which fluidic unit 8, in turn, has a medium feed channel from the metered media supply connection 17 to the valve chamber 11 of the valve unit 9, in order to continuously guide metered medium from a reservoir 17r, here, e.g., a metered substance cartridge 17r, via the metered media supply connection 17 and the medium feed channel into the valve chamber 11.

A desired metered medium is applied in portions from the reservoir 17r of a nozzle 12 of the valve chamber 11 to a workpiece during operation by means of the metering system 1. For this purpose, at least a drop of a desired metered medium or metered substance, respectively, the amount of which can be metered exactly, is delivered during the metering through an opening cross section of the nozzle 12 or of a nozzle insert 12', respectively, in the nozzle 12, in a metering direction DR. This can be controlled indirectly via the lever 30 by means of a quick movement or ram movement 30B, respectively, of the ram 13, and driven by the actuators 50a, 50b operating in a diametrically opposed manner. The changeable nozzle insert 12' in the nozzle 12 of the valve chamber 11 thereby serves the purpose of being able to adjust the metered quantity and shape of the drop even more specifically for different fields of application.

The remaining components within the frame housing unit 2 will now be described in the following.

That spring element 21 (already mentioned above) bracing the movement mechanism 3, 4, 5, 30, 50a, 50b in the frame housing unit 2 abuts against the housing bottom 2' of the frame housing unit 2 on the bottom within the frame housing unit 2 and thereby braces the lever 30, which is supported rotatably about the axis of rotation R on the lever mount 4 via the two actuators 50a, 50b, which abut against the lever 30 close to the tilt axis R, against an upper portion or frame, respectively, of the frame housing unit 2. By means of the bracing, the two piezoelectric actuators are preloaded via the lever mounting unit, which is required to avoid tensile stresses during the dynamic operation. Dynamic vibrations are simultaneously strongly weakened due to the mass of the frame housing unit 2, which is relatively inert thereto, and thermal differences or temperature gradients, respectively—which can result due to the movement mechanism 3, 4, 5, 30, 50a, 50b, which operates highly dynamically—are uncoupled from the frame housing unit 2 of the metering system 1 and are coupled or equated to the valve unit 9, respectively. These effects thus have virtually no influence on the metering process of the metered medium from a nozzle 12 of the valve unit 9. In the exemplary embodiment illustrated here of the metering system 1 according to the invention, the spring element 21 is a disc spring set 21 comprising, for example, four single plate springs, which are supported vertically one above the other and which are resiliently supported one below the other and the spring forces of which add up. The construction is compressed in a flat manner, which effects a high attenuation of the disc spring set and thus also leads to a reduction of the vibration tendency of the frame housing unit against the lever mounting unit again.

As already mentioned, the spring element 21 be connected, e.g., screw-connected here, to the housing bottom 2', e.g., metal sheet, plate, etc., of the frame housing unit 2 on the underside. It can thus be firmly coupled on one side, here on the underside. Alternatively, however, the spring element could also be only clamped therebetween.

So that the two parts 4, 5 can be braced against one another at a distance or with a spacer gap, respectively, from the housing bottom 2', surrounding or engaging around, respectively, the disc spring set 21 in a ring-shaped or ring-like manner, respectively, the housing bottom 2' in FIG.

1 has cutouts to the right and left of the disc spring set 21 (to the side or to the bottom, respectively).

The lever mount 4 rests on the spring element 21 on the top side and is pressed against the spring element 21 by means of the actuators 50a, 50b, as mentioned.

The lever mount 4 has two lateral "legs" (located one behind the other in FIG. 1 in the direction of the drawing plane) comprising depressions, which are opened to the top in the shape of a semicircle. An interior, which is adapted to the lever 30 with the necessary freedom of movement, is formed between the legs for partially receiving the lever 30. Only one of the two said legs of the lever mount 4 is visible in the side view according to FIG. 1 because the two legs—viewed from this direction—are located one behind the other. One of the two cylinder pins 42 forming the axis of rotation R (see FIG. 5) can be seen in the depression of the visible (here front) leg. To be able to better identify the setup of this part of the metering system 1, the section line B-B in FIG. 3, which runs longitudinally through the lever 30, which is illustrated in an isolated manner, also uses the section line course (in the manner of a "single rectangular pulse"), as it is also used by the section line A-A from FIG. 2, which has already been mentioned above.

As can be seen in FIG. 5, each of said cylinder pins 42 in each case rests laterally approximately with an outer half 42a (along the cylinder pin axis) on one of the legs of the lever mount 4 and simultaneously holds (so as to be rotatably about itself) the lever 30 in the interior of the lever mount 4 with the other, inner half 42b. For this purpose, the cylinder pins 42 in each case protrude into a lateral recess 41 (description further below), which is formed transversely (in a transverse direction 30Q) in the lever 30 and which is open to the bottom in a U-shaped manner (closed to the top), of the lever 30, which recess 41 is suggested in a dashed manner in the top view onto the lever 30 in FIG. 3 and which is shown from the side in FIG. 4.

The shape of the lever 30 can be graphically described as a two-sided, three-dimensional, asymmetric force transducer in the manner of a "barrier beam" (with counter weight). Concretely, the lever arm 31 of the lever 30 comprises, in its longitudinal direction 30L, a voluminous, rather massive, roughly cuboidal portion on approximately one half, and a narrow, elongate handle or "arm", respectively, which is constructed to be as light as possible, on the other half. One half (on the right in FIG. 3 here) of the cuboidal portion belongs to a shorter lever arm side 32 of the two-sided lever arm 31. The other (on the left in FIG. 3 here) half of the cuboidal portion, together with the elongate arm connecting thereto, belongs to a longer lever arm side 35 of the two-sided lever arm 31. The axis of rotation R of the lever 30 is located therebetween, next to which the two actuators 50a, 50b of the movement mechanism 3, 4, 5, 30, 50a, 50b engage with the actuator engagement points 36, 37 on the lever 30. A first (FIGS. 1 and 2 left) actuator 50a thereby engages with a first (here left) actuator engagement point 36, which is sunken or recessed, respectively, in the interior of the lever 30, of the first lever arm side 35 of the two-sided lever arm 31, and a second (here right) actuator 50b engages with a second (here right) equally sunken or recessed actuator engagement point 37, respectively, of the second lever arm side 32 of the two-sided lever arm 31 (see also FIGS. 3 to 5 with regard to the position of the actuator engagement points 36, 37).

In the case of a normal arrangement of the metering system 1, as it is illustrated in FIG. 1 here, the two actuators 50a, 50b thus abut directly against the lever 30 (in each case on a cylinder pin 36z, 37z of the actuator engagement points 36, 37, which will be described below) on a (lever) top side 40 (in FIG. 1 on the top in the depth direction 30T) in the cuboidal portion.

It is thereby shown on the basis of the lever 30, which is illustrated in a partially transparent manner in perspective view in FIG. 5, and of a part of the two actuators 50a, 50b, how exactly the two actuators 50a, 50b or the fronts 54 thereof, respectively, engage with or abut against the lever 40, respectively, in order to tilt the latter as intended by several degrees about the axis of rotation R or tilt axis R, respectively, that is, how they transfer a tilting moment or a longitudinal deflection, respectively, to the lever 30 in their respective direction of action 52a, 52b. As follows with regard to this from the enlarged section in FIG. 5, the actuators 50a, 50b abut with their directions of action 52a, 52b tangentially against a circle K of the engagement points (or actuator engagement points 36, 37, respectively), so that the directions of action 52a, 52b are in each case perpendicular to a radial connecting line $V_a, V_b$ to the common axis of rotation R in the center of the circle K. Due to the fact that the directions of action 52a, 52b thereby engage tangentially with the circle K, a longitudinal deflection, i.e. a tilting moment of a respective actuator 50a, 50b, the front 54 of which thereby moves with the lever 30 by a few degrees minimally along the circle K about the axis of rotation R (about the tangential position or central position $P_0$, respectively, of the lever, which is illustrated in FIG. 5) to the bottom or to the top in an arc-shaped manner, generates only a minimal transverse movement. If the actuators 50a, 50b or the directions of action 52a, 52b thereof, respectively, were to each engage further on the top or bottom along the circle K, the same deflection by a few degrees along the circle K would cause a significantly larger transverse movement of the front 54 of the respective actuator 50a, 50b. This otherwise significantly more arc-shaped circular path movement or pendulum movement, respectively, along the circle K can be reduced to a longitudinal deflection, which is as straight as possible, by means of the tangential arrangement of the directions of action 52a, 52b on the circle K about the axis of rotation R.

On a (lever) underside (in FIG. 1 on the bottom in the depth direction 30T), the lever 30 abuts indirectly in the cuboidal portion at the axis of rotation R between the actuator engagement points 36, 37 (with the outer halves 42a of the cylinder pins 42) against the lever mount 4 and is in contact with the ram head 14 of the ram 13 in the end portion 33 of the elongate arm. A further bore 34 is formed in the lever 30 at the end portion 33 of the arm of the lever 30. It serves for the introduction of a permanent magnet and thus for the position determination of the lever 30 by means of a HALL sensor fastened to the lever mounting unit 3.

So that the actuators 50a, 50b abut for the first time against the actuator engagement points 36, 37 in the interior of the lever 30 below a rotational/axis of rotation plane $X_R$ (and not already on the surface on the top side 40 of the lever 30), the lever 30 has wedge recesses 39 tapering downwards in a wedge-shaped manner, which start on the top side 40 and extend all the way to the actuator engagement points 36, 37 in the interior of the lever 30. The respective lowest points or locations, respectively, of the wedge recesses 39 in the lever 30 thereby define a first actuator engagement point 36 for a first actuator 50a (the left actuator in FIG. 1) and a second actuator engagement point 37 for a second actuator 50b (the right actuator in FIG. 1). The wedge recesses 39 are formed so that the fronts or tips 54, respectively, which likewise taper in a wedge-shaped manner when the metering system 1 is assembled as intended, of the actuators 50a, 50b, which are placed obliquely to one another, find space therein on the other side or are received with some play, respectively.

As can be seen in particular in FIG. 5, the actuator engagement points 36, 37 structurally consist of the two cylinder pins 36z, 37z, which have already been mentioned, against which the actuators 50a, 50b abut with their fronts 54 and can roll on the cylinder pins 36z and 37z. On the front, the abutting front sides of the fronts 54 of the actuators 50a, 50b are thereby in each case concavely adapted to the cylinder pins 36z, 37z with a, relatively speaking, slightly larger radius. For this purpose, the core bores are formed to be continuous in the transverse direction 30Q from one longitudinal side to the other longitudinal side of the lever 30 through the lever 30, are virtually completely filled out by the cylinder pins 36z, 37z (see FIG. 5), and intersect an end region of the wedge recesses 39, so that the core bores are open to the top towards the wedge recesses 39 in sections. The radius of the core bores is thereby adapted to the cylinder pins 36z, 37z, so that a secure hold is ensured, and the actuators 50a, 50b ensure a low-friction relative rolling movement with their fronts 54 on the fixed cylinder pins 36z, 37z.

The recesses 41, which have already been mentioned above, for the other cylinder pins 42, which have already been mentioned above, by means of which the lever 30 is in fact supported tiltably about the axis of rotation R in the interior between the two legs of the lever mount 4, are located centrally in the longitudinal direction 30L, obliquely above between said core bores. The radius of the recesses 41 is also slightly larger than the radius of the cylinder pins 42, so that a "fixed" target position is likewise present and a low-friction relative rolling movement is nonetheless ensured. Viewed in the transverse direction 30Q, the recesses 41 start outside the wedge recesses 39 in edge regions of the lever 30, which are located opposite one another and spaced apart from one another (see FIG. 3). In the depth direction 30T of the lever 30, they extend from the underside to above a so-called engagement axis plane $X_A$ of the lever 30 (see FIG. 4). By definition, the engagement axis plane $X_A$ is spanned or formed, respectively, by the actuator engagement points 36, 37, which actuator engagement points 36, 37 are located on the surfaces of the cylinder pins 36z, 37z. In a central position $P_0$ of the lever 30, the engagement axis plane $X_A$ is aligned horizontally. The cylinder pins 42 are thereby (as can be seen in FIG. 5) received with approximately half of their length with the inner half 42b in the recesses 41 (against which they abut on the top side or with their top side, respectively, as mentioned above) and rest with the other outer half 42a with their underside on the legs in the depressions of the lever mount 4, which are open to the top in the shape of a semicircle. The lever 30 can therefore be inserted very easily from the top into the lever mount 4 during an assembly, in order to reach this operating state, before the further components are attached or mounted, respectively.

In the operating state, the lever 30 as a whole is arranged on or in the lever mount 4, respectively, in a highly space-saving manner because it protrudes into the interior between the legs of the lever mount 4 or is received therein, respectively, in its depth direction 30T approximately up to half of its height or depth, respectively, with just enough play. With this type of support, it can be tilted, as provided, about the tilt axis R without direct contact to the lever mount 4 at least by several degrees, namely preferably between +−0.1° to +−5° (degrees). A tilt angle of +−0.5° is particularly preferable thereby. Its axis of rotation R, which runs in the transverse direction through the lever 30, thereby runs eccentric from its center of gravity in the longitudinal direction 30L.

In order to reduce the weight of the lever 30, in particular of its longitudinal arm, if possible, the lever 30 has, in addition to the wedge recess 39 close to the arm (on the left in FIG. 4), four bores 38 or recesses 38, respectively. The bores 38 are circular, of a different size, and decrease in diameter in the direction towards the end portion 33 because they are adapted to the shape of the lever 30, which, as a whole, becomes flatter towards the end portion 33. They are each slightly spaced apart from one another and, viewed in the transverse direction 30Q, each run continuously through the lever 30. The bores 38 functionally ensure a maximum weight reduction of the lever 30, without thereby negatively impacting the stability of the lever 30. The above wording "becomes flatter" means that, starting with the wedge recess 39 close to the arm, the lever 30 has an underside, which runs obliquely to the top side 40, in the longitudinal direction 30L towards the end portion 33, thus becomes less deep or flatter, respectively, in the depth direction 30T. The end portion, which is in contact with the ram head 14, at the end of the elongate arm in the central position $P_0$ of the lever 30 thus lies exactly at the same height as the upper end of the recesses 41 in the lever 30 for the above-mentioned cylinder pins 42 in the voluminous portion of the lever 30. In other words, the end portion 33 in the central position $P_0$ of the lever 30 thus lies exactly in the rotational or axis of rotation plane $X_R$, respectively.

For this purpose, a lever mount end (not illustrated for the sake of clarity) can be attached to the lever mount 4 on the top side (not mandatorily), at least enclosing the cylinder pins 42 to the top, as upper end or partially open cover with holes for the actuators 50a, 50b, respectively. In order to thereby enclose or surround the lever 30, respectively, virtually completely from the top, such a lever mount end can have approximately the same size and shape as the lever mount 4 therebelow. It can thereby have through openings for the actuators 50a, 50b running obliquely from the top to the bottom, through which the actuators 50a, 50b extend with their cylindrical transducers 53 (in the direction of action 52a, 52b behind the fronts 54 of the actuators 50a, 50b), in order to be able to engage with the actuator engagement points 36, 37 on the lever 30. By means of a lever mount 4 and a lever mount end thereabove, it is achieved that the lever 30 is supported movably therein so as to be largely shielded against the remaining metering system 1.

The two actuators 50a, 50b, which are placed obliquely to one another and which are aligned symmetrically to the axis $S_T$, which, as mentioned, abut with their concavely formed front sides of the tips or fronts 54, respectively, against the cylinder pins 36z, 37z of the actuator engagement points 36, 37 on the lever 30, are arranged above the lever 30.

The two actuators 50a, 50b or piezo actuators 50a, 50b, respectively, which are constructed identically, are each several piezo elements 51 or "piezo plates", respectively, which are stacked as usual to form a piezo stack, by means of which a mechanical movement is generated in the longitudinal direction or direction of action 52a, 52b, respectively, of the actuators 50a, 50b, i.e. a longitudinal change normally or perpendicular, respectively, to the surface of the piezo elements 51 along the longitudinal axis 52a, 52b of the respective actuator 50a, 50b, by applying an electric current by means of the so-called "inverse piezo effect".

The encapsulated actuators 50a, 50b are thereby in each case embedded in a recess 56 of the frame housing unit 2, which is sealed by means of O-rings 57 around the piezo elements 51 and are cooled during operation with the help of a cooling device 60 of the metering system 1, which is integrated in the frame housing unit 2, within the recess 56 in the frame housing unit 2.

The cooling device 60 or the cooling channel system 60, respectively, comprises a feed channel 61 for introducing a cooling medium for cooling the piezo elements 51 centrally between the actuators 50a, 50b as well as two discharge channels 63a, 63b for the parallel continuously following repeated discharge of the cooling medium laterally, in the longitudinal direction 30L (on the left and right in FIG. 1) next to the piezo elements 51 or actuators 50a, 50b, respectively. From a source coupled to the metering system 1 on the upper portion or frame, respectively, of the frame housing unit 2, the cooling medium flows in the feed channel 61 parallel to the actuators 50a, 50b in a cooling flow direction 60i (directed downwards in FIG. 1) to the transducers 53 of the actuators 50a, 50b. Directly above the transducers 53—sealed by two O-rings 57 to seal the gap between the recess 56 and an outer skin of the hermetically encapsulated actuators 50a, 50b—it is deflected or diverted, respectively, in an opposite direction opposite to the direction of action 52a, 52b of the actuators 50a, 50b to the end-side connections 55 of the actuators 50a, 50b (obliquely upwards in FIG. 1) and subsequently flows in each case via lateral inlets 62 of the feed channel 61 perpendicular (obliquely downwards) into the recess 56 of the piezo elements 51 of the actuators 50a, 50b, which are placed obliquely to one another, so that the cool cooling medium flows all around the piezo elements 51 of the actuators 50a, 50b. The cooling medium thereby propagates evenly from an inner side centrally between the actuators 50a, 50b (slightly obliquely downwards) to the outside along the meander-shaped outer skin of the hermetically housed stacked piezo elements 51 or around the piezo elements 51, respectively, absorbs the heat generated by the actuators 50a, 50b, and subsequently flows via lateral outlets 64 out of the recess 56 into the two discharge channels 63a, 63b (on the right and left) on the outer sides of the actuators 50a, 50b. There, in the two lateral discharge channels 63a, 63b, the heated cooling medium is sucked in or discharged, respectively, (upwards) in a cooling flow direction 60o directed (upwards) to the two outlets of the discharge channels 63a, 63b of the cooling channel system 60 on the upper portion or frame, respectively, of the frame housing unit 2. A back pressure of the cooling medium in the cooling channel system 60 can be minimized by means of the individual central introduction and the two-sided parallel discharge of the cooling medium on the two outer sides of the actuators 50a, 50b, which are spaced apart from one another in the longitudinal direction 30L, and a cooling power or cooling effectivity, respectively, of the cooling channel system 60 can thus be maximized.

In addition to the end-side connections 55 for controlling the current or power supply, respectively, of the actuators 50a, 50b, the actuators 50a, 50b in each case comprise a temperature sensor 65, which supplies temperature data, by means of which, for example the cooling power of the cooling channel system 60 can be regulated or controlled, respectively.

In summary, the metering system 1 can be divided or broken down, respectively, structurally as well as functionally substantially into two units 2, 60, 3, 4, 5, 30, 50a, 50b, which are supported resiliently against one another via the spring element 21, as follows. A "static" unit 2 comprises, for example, the frame housing unit 2 and the housing bottom 2' of the frame housing unit 2. In addition, it can comprise at least the integrated cooling device 60, a control board for controlling the metering system 1, an insulating board, a connecting board, possible connections, in particular for the source and the outlets of the cooling medium, and a power supply for the metering system 1.

A "dynamic" unit 3, 4, 5, 30, 50a, 50b or movement mechanism 3, 4, 5, 30, 50a, 50b, respectively, comprises at least the lever mounting unit 3 comprising the lever mount 4 and the fluidic positioning 5, the lever 30, and the two actuators 50a, 50b. In addition, it can be coupled to the fluidic positioning 5 with the valve unit 9 and the fluidic unit 8 and can optionally comprise a permanent magnet on the lever 30 and a corresponding HALL sensor on the lever mounting unit 3 for determining the position or setting, respectively, of the lever 30. Either a metered substance cartridge 17r or only a feed line or a hose, respectively, from a metered substance tank can thereby be connected to the fluidic unit 8 on the metered media supply connection 17.

The two above-mentioned units can thereby advantageously be dimensioned and weighted so that they have substantially the same mass, i.e., a total mass of the metering system 1 is divided substantially in equal parts into the "static" unit as well as into the "dynamic" unit. As intended with the invention, an even more stable, more high-quality metering result as a whole with a particularly high metering speed or metering frequency, respectively, is thus achieved because the vibrations of the two units weaken or balance each other out, respectively. Provided that the fluidic unit 8, as illustrated in FIG. 1, is formed with a metered substance cartridge 17r, the content of which changes with the metering, this can be taken into consideration during the distribution of the total mass, for example in such a way that the main masses of the total mass balance each other out at least on average.

Lastly, it is pointed out once again that the devices, which are described in detail above, are only exemplary embodiments, which the person of skill in the art can modify in a variety of ways, without leaving the field of the invention. For example, the metering system could thus also be redesigned structurally in such a way that a correspondingly formed and arranged tension spring could be used as spring element. The use of the indefinite article "a" furthermore does not rule out that the respective features can also be present more than once.

LIST OF REFERENCE NUMERALS 1 metering system
2 frame housing unit
2' housing bottom
3 lever mounting unit
4 lever mount
5 fluidic positioning
5s interface between fluidic positioning and fluidic unit
6 rotary joint
7 adjusting element/adjusting screw
8 fluidic unit
9 valve/valve unit
10 valve body
11 valve chamber/nozzle chamber
12 nozzle
12' nozzle insert
13 ejection element/ram
14 ram head
15 tappet spring
16 ram tip
17 metered media supply connection 17r reservoir/metered substance cartridge
18 heating unit
19 connection/heating cable
20 heating element
21 spring element/disc spring set
30 lever
30B ram movement
30L longitudinal direction of the lever
30Q transverse direction of the lever
30T depth direction of the lever
31 lever arm, two-sided
32 shorter lever arm side
33 end portion
34 bore (for permanent magnets)
35 longer lever arm side
36 first actuator engagement point
36z first cylinder pin of the first actuator engagement point
37 second actuator engagement point
37z second cylinder pin of the second actuator engagement point
38 bores/through bores/recesses
39 wedge recesses
40 (lever) top side of the lever
41 recess for cylinder pins in the lever mount
42 cylinder pins
    42a outer half of the cylinder pin
    42b inner half of the cylinder pin
50a, 50b actuators/piezo actuators (here encapsulated)
51 piezo elements
52a first direction of action/longitudinal axis of the first actuator
52b second direction of action/longitudinal axis of the second actuator
53 transducer of the actuators
54 fronts/tips of the actuators
55 connections of the actuators
56 recess for the piezo actuators
57 O-ring
60 cooling device/cooling channel system
60i, 60o cooling flow directions
61 feed channel
62 inlets of the feed channel into the actuators
63a, 63b discharge channels, two
64 outlets of the discharge channel from the actuators
65 temperature sensor
A-A section line through the metering system
B-B section line through the lever
DR metering direction
K circle of the actuator engagement points
$P_0$ central position
R axis of rotation/tilt axis
$S_T$ first axis of symmetry of the symmetry plane of the actuators
$S_Q$ second axis of symmetry of the symmetry plane of the actuators
$V_a$ first connecting line
$V_b$ second connecting line
$X_A$ engagement axis plane
$X_R$ rotational/axis of rotation plane

The invention claimed is:

1. A metering system (1) for metering a metered medium comprising
a frame housing unit (2),
a lever mounting unit (3) which is supported on the frame housing unit (2) comprising a lever mount (4),
a lever (30) which is supported rotatably by means of the lever mount (4) about a tilt axis (R) comprising a two-sided lever arm (31) extending substantially in a longitudinal direction (30L) of the lever (30),
    wherein one lever arm side (35), has a first actuator engagement point (36) close to the tilt axis and is in contact remotely from the tilt axis at an end portion (33) with an ejection element (13) and wherein the other lever arm side (32) has a second actuator engagement point (37) close to the tilt axis,
two actuators (50a, 50b), which, during operation, exert a tilting moment in opposite directions on the lever (30) at the first and second actuator engagement point (36, 37),
wherein the actuators (50a, 50b) are placed obliquely to one another and wherein together, the lever mounting unit (3), the lever (30), and the two actuators (50a, 50b) form a movement mechanism (3, 4, 5, 30, 50a, 50b), which is braced on the frame housing unit (2) by means of at least one spring element (21).

2. The metering system according to claim 1, wherein the two actuators (50a, 50b) are located on a common longitudinal side of the lever (30).

3. The metering system according to claim 1, wherein the actuators (50a, 50b) are placed obliquely to one another in a V-shaped manner maximally at a 150° angle.

4. The metering system according to claim 1, wherein the actuator engagement points (36, 37) on the lever (30) for the actuators (50a, 50b) are not located in a plane of the tilt axis (R).

5. The metering system according to claim 1, wherein the lever (30) is formed and arranged in such a way that the actuator engagement points (36, 37) are positioned in the lever (30) further away from a longitudinal side of the lever (30) facing the actuators (50a, 50b), than the tilt axis (R), on which tilt axis (R) the lever (30) is supported rotatably.

6. The metering system according to claim 1, wherein the actuators (50a, 50b) engage with the actuator engagement points (36, 37) in such a way that in a central position (P0) of the lever (30), a longitudinal axis (52a, 52b) of the actuators (50a, 50b) is in each case substantially perpendicular to a respective connecting line (Va, Vb) between the respective actuator engagement point (36, 37) and the tilt axis (R).

7. The metering system according to claim 1, wherein the actuators (50a, 50b) are arranged tangentially on a circle (K) about the tilt axis (R) on the actuator engagement points (36, 37) in such a way that they substantially perform a straight movement during operation for metering a metered medium in response to an ejection and withdrawal movement.

8. The metering system according to claim 1, wherein the lever (30) has an inhomogeneous mass distribution.

9. The metering system according to claim 8, wherein a mass of the lever (30) is distributed relative to the tilt axis (R) along the lever (30) in such a way that the lever (30) as a whole, based on the tilt axis (R), has a smallest possible (mass) moment of inertia.

10. The metering system according to claim 1, wherein the lever (30) has a plurality of recesses (38) for weight reduction purposes.

11. The metering system according to claim 1, wherein a total mass of the metering system (1) is divided substantially evenly to the frame housing unit (2) and the lever mounting unit (3).

12. The metering system according to claim 1, wherein the lever mounting unit (3) is of multi-part construction.

13. The metering system according to claim 12, wherein the lever mounting unit (3) comprises a fluidic positioning (5) for a fluidic unit (8) of the metering system (1) in addition to the lever mount (4).

14. The metering system according to claim 13, wherein the lever mount (4) is connected in a rotatable manner to the fluidic positioning (5) via a rotary joint (6), and/or wherein the lever mount (4) and the fluidic positioning (5) are supported in a mechanically adjustable manner against one another.

15. The metering system according to claim 1, wherein the lever mounting unit (3) comprises a ring construction (4, 5), which encloses a portion (2') of the frame housing unit (2) in a ring-like manner by leaving at least one gap.

16. The metering system according to claim 15, wherein the lever mounting unit (3) is supported on the frame housing unit (2) in a displaceable manner by means of the spring element (21), which is arranged in a gap between the lever mounting unit (3) and the portion (2') of the frame housing unit (2).

17. The metering system according to claim 15, wherein the ejection element (13) is a ram (13), and wherein the ring construction (4, 5) comprises a rotary joint (6), and the lever mount (4) of the lever mounting unit (3) is coupled to a fluidic positioning (5) in a mechanically adjustable manner via the lever (30) and the ram (13) for adjusting a ram-nozzle distance on a side of the fluidic positioning (5) remotely from the rotary joint by means of an adjusting element (7).

18. The metering system according to claim 17, wherein the adjusting element (7) is an adjusting screw.

19. The metering system according to claim 1, wherein the actuators (50a, 50b) are in each case formed in an encapsulated manner, and/or wherein both actuators (50a, 50b) in each case comprise at least one temperature sensor (65).

20. The metering system according to claim 1, wherein a cooling device (60), through which gas or liquid flows, in each case surrounds the actuators (50a, 50b).

21. The metering system according to claim 20, wherein the cooling device (60) has a feed channel (61) between the actuators (50a, 50b) comprising inlets (62) into the actuators (50a, 50b) and two eccentric discharge channels (63a, 63b) comprising outlets (64) into the discharge channels (63a, 63b).

22. The metering system according to claim 1, wherein the lever (30) is asymmetrical, wherein the lever arm side (35) that is longer has the first actuator engagement point (36), and wherein the lever arm side (32) that is shorter has the second actuator engagement point (37).

23. The metering system according to claim 1, wherein the ejection element (13) is a ram (13).

24. The metering system according to claim 1, wherein the spring element (21) is arranged so that it braces the lever mounting unit (3) against the frame housing unit (2) via the lever (30) and via the two actuators (50a, 50b).

\* \* \* \* \*